United States Patent [19]

Hayashi et al.

[11] Patent Number: 4,540,881

[45] Date of Patent: Sep. 10, 1985

[54] METHOD OF DETECTING FOCUSING CONDITIONS

[75] Inventors: Asao Hayashi, Hachioji; Masahiro Aoki, Fussa; Kenichi Oinoue, Tokyo; Masatoshi Ida, Hachioji, all of Japan

[73] Assignee: Olympus Optical Co., Ltd., Tokyo, Japan

[21] Appl. No.: 361,435

[22] Filed: Mar. 24, 1982

[30] Foreign Application Priority Data

Mar. 27, 1981 [JP] Japan .................... 56-44183

[51] Int. Cl.³ .............................. G01J 1/20
[52] U.S. Cl. ...................... 250/201; 250/204; 354/406
[58] Field of Search ............ 250/204, 201; 354/25, 354/402, 404–409; 356/4

[56] References Cited

U.S. PATENT DOCUMENTS

| 4,133,606 | 1/1979 | Hosoe et al. ............... 250/201 |
| 4,203,031 | 5/1980 | Kamachi et al. ............ 250/201 |
| 4,320,302 | 3/1982 | Stein .......................... 250/204 X |
| 4,352,545 | 10/1982 | Uno et al. ................... 250/204 X |
| 4,359,634 | 11/1982 | Saito et al. .................. 250/201 |
| 4,412,741 | 11/1983 | Stein .......................... 250/204 X |

Primary Examiner—David C. Nelms
Attorney, Agent, or Firm—Parkhurst & Oliff

[57] ABSTRACT

A method of detecting focusing conditions used for optical machinery is disclosed. The focusing conditions of an optical image projected onto photodetector arrays arranged on both sides of the focal plane with a certain optical distance are detected based on an evaluation function representing a sum of absolute values of differences between output signals of adjacent photodetectors. When a value of a first evaluation function represented by the largest absolute value is less than a predetermined threshold a second evaluation function represented by a sum of the maximum and next largest absolute values is used thereby detecting the focusing conditions for a graded image.

9 Claims, 9 Drawing Figures

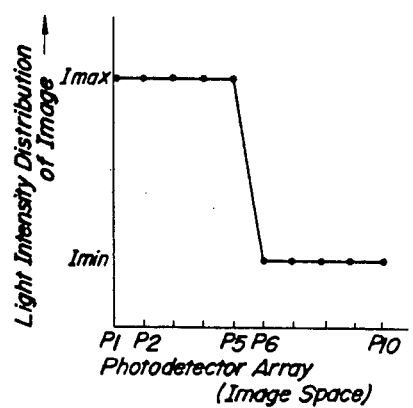
FIG_1A
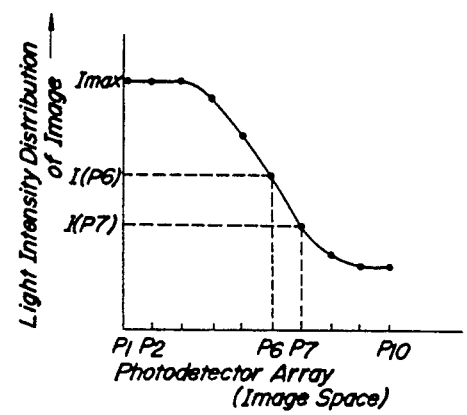
FIG_1B
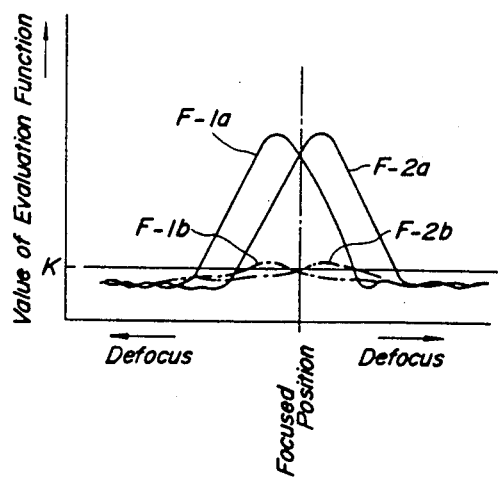
FIG_2

FIG._7A
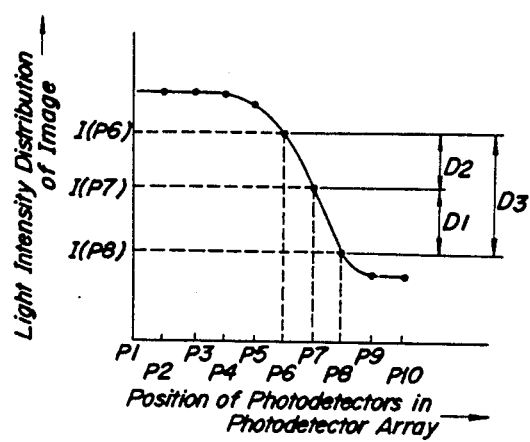
FIG._7B
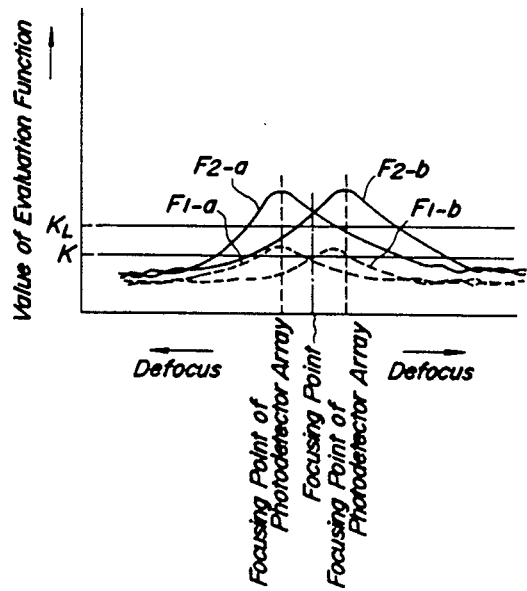

METHOD OF DETECTING FOCUSING CONDITIONS

BACKGROUND OF THE INVENTION

The present invention relates to a method of detecting focusing conditions used for optical machinery such as cameras, microscopes, endoscopes or the like, and more particularly to a focusing condition detecting method in which an optical image of a subject is projected onto a pair of photodetector arrays each including a plurality of photo-electro transducer elements arranged on both sides of a predetermined focal plane by means of an imaging lens, and output signals transduced by the photodetectors are arithmetically operated to derive values of a contrast evaluation function for the image projected onto the photodetector arrays, thereby detecting the focusing conditions for the imaging lens.

A method of detecting focusing conditions such as the method described in Japanese Patent Application Laid-Open No. 57,809/80 has been developed.

In the above mentioned method, use is made of a pair of photodetector arrays arranged on both sides of the focal plane of the imaging lens at a certain optical distance, signals derived from the photodetector arrays are converted into digital signals, and sums of difference signals having values from the maximum value down to Nth largest value therefrom are calculated from absolute values of difference between the output signals delivered from adjacent photodetectors. The focusing point is thereby detected as a position where the sum F-1a for the first photodetector array is made equal to the sum F-2a for the second photodetector array.

This method utilizes a pair of photodetector arrays to automatically control the focusing conditions for the imaging lens. If the focusing conditions are only detected, however, it is only sufficient to use one photodetector array so that the focusing condition detecting method in case of utilizing one photodetector array is explained hereinafter, in order to clarify the problem thereof in comparison with the present invention.

For convenient explanation, it is assumed that the evaluation function takes only the maximum value selected from the absolute values of differences between output signals of adjacent photodetectors.

FIG. 1 shows the relationship between the image space of subject image projected onto the photodetector array of the imaging lens and the light intensity distribution of the image by plotting photodetector arrays P1 to P10 on the abscissa and outputs of respective photodetectors on the ordinate. That is, FIG. 1A shows the state that optical reflection density of the subject is changed in step like. In this stepped change portion of reflection density the output signals of adjacent photodetectors P5 and P6 correspond to a maximum (Imax) and a minimum (Imin) of light intensity distribution, respectively.

In this case the evaluation function F-1a of the photodetector array represented by the maximum value among the absolute values of difference between outputs of adjacent photodetectors, exhibits a sharp peak near the position that the subject image is focused at a plane of the photodetector array as shown in FIG. 2 and the peak value thereof is large as shown by [F-1a(peak)- = |Imax-Imin|].

On the other hand, when reflection density of the subject is graded or gently changed, the light intensity distribution of the image is obtained as shown in FIG. 1B. In this case the evaluation function F-1b of the photodetector array has a peak near the focusing position as shown in FIG. 2 and its peak value [F-1b(peak)- = |I$_{(P6)}$-I$_{(P7)}$|] is very small as compared to the peak value F-1a.

As is seen from FIG. 2 the evaluation function has a relatively low level at the position more apart from the focusing point and this level fluctuates due to the difference in properties of respective photodetectors (P1 to P10) and the quantizing noise or the like caused at A/D conversion of the outputs from respective photodetectors, so that it is difficult to detect the focusing conditions for the graded subject. Therefore, when use is made of a pair of photodetector arrays and the position equal to the values of evaluation function obtained from the outputs of respective photodetectors is detected as a focused position, it is difficult or sometimes impossible to decide the focusing conditions when the level is less than a certain value of the evaluation function.

FIG. 2 shows various evaluation functions obtained by using a pair of photodetector arrays arranged on both sides of a predetermined focal plane at a certain distance along an optical axis of the imaging lens and by applying the above evaluating method. In FIG. 2 the evaluation functions for the stepped light intensity distribution of the image are shown by F-1a and F-2a, and the evaluation functions for the graded light intensity distribution of the image are shown by F-1b and F-2b, respectively. The position at which the values of evaluation functions obtained for the photodetector arrays are equal to each other is detected as an in focus position for the imaging lens.

In a common object, the boundary between two objects, or the boundary between hair and a face is considered to be the stepped subject, while the portion forming gradually deep shadow such as cheeks or a nose in a face is considered to be the graded subject.

In the above described conventional method only the maximum value of the absolute values of differences between output signals of adjacent photodetectors is taken as the value of the evaluation function. In order to obtain the value of the evaluation function of a subject image having stepped change portion of reflection density the pitch of photodetectors must be made smaller. Then, the difference between outputs of adjacent photodetectors also becomes smaller, so that the value of the evaluation function becomes smaller as shown in FIG. 2, which results in a difficulty of detecting the focusing conditions in the case of the graded subject image.

SUMMARY OF THE INVENTION

It is an object of the present invention to overcome the above described disadvantages of the conventional focusing condition detecting method.

It is another object of the present invention to provide a method of detecting the focusing conditions which is capable of easily detecting the focusing conditions even if the light intensity distribution of subject image projected onto the photodetector array has a graded form.

It is a further object of the present invention to provide a focusing condition detecting method which is capable of detecting the focusing conditions with high precision at any time by changing the arithmetical operating method in the case of a small evaluation value.

According to the present invention, in a method of detecting the focusing conditions comprising the steps of:

providing at least one photodetector array including K photo-electro transducer elements arranged at or near a focusing plane for an imaging lens and/or a plane optically conjugated with the focusing plane;

projecting a subject image onto the photo-electro transducer elements by the imaging lens, thereby generating photo-electro transducer signals;

calculating a value of evaluation function representing the contrast or sharpness of the subject image from the photo-electro transduced signals; and deciding a focusing condition of the imaging lens based on the calculated value of evaluation function;

the improvement comprises the steps of:

providing a first evaluation function expressed by photo-electro transduced signals supplied from a predetermined number of photodetector elements and a second evaluation function expressed by the larger number of photodetector elements than the predetermined number; and selecting the first evaluation function or the second evaluation function in accordance with the subject image.

In a preferred embodiment of the invention, the first evaluation function is a sum of difference signals having the N largest values selected from the absolute values of difference between the photo-electro transduced signals of each adjacent photodetector in the photodetector array, and the second evaluation function is a sum of difference signals having the N+L largest values selected from the absolute values of said differences (N is a positive integer within the range of $1 \leq N \leq K-2$, and L is a positive integer within the range of $2 \leq N+L \leq K-1$).

In a further preferred embodiment of the invention, the decision of focusing conditions is performed at first by the first evaluation function and then by the second evaluation function when the evaluation value obtained by the first evaluation function is less than a predetermined threshold $K_L$.

BRIEF DESCRIPTION OF THE DRAWINGS

FIGS. 1A, 1B and 2 are explanatory views explaining a light intensity distribution of an object image and curves of evaluation function according to a conventional focusing condition detecting method, respectively;

FIG. 7 is an explanatory view explaining the function and effect of the method according to the present invention.

DESCRIPTION OF THE PREFERRED EMBODIMENT

Figure 3:
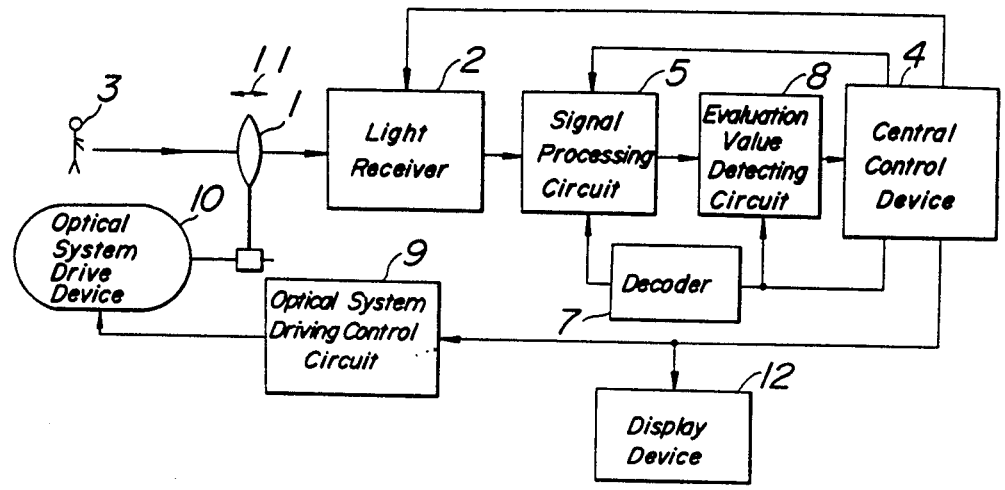
FIG. 3 is a block diagram showing a construction of the focusing condition detecting apparatus for carrying out a method of detecting the focusing conditions according to the present invention.

Referring now to the drawing, wherein the same reference characters designate the same or corresponding parts throughout the several views, there is shown a focusing condition detecting apparatus for carrying out the method of detecting the focusing conditions according to the present invention. FIG. 3 shows a construction of the focusing condition detecting apparatus. In FIG. 3 reference numeral 1 is an imaging lens and reference numeral 2 is a light receiver which is constructed so that a pair of photodetector arrays consisting of a plurality of photo-electro transducer elements are arranged at a certain optical distance along an optical axis of the imaging lens 1 and a part of the optical image of a subject 3 formed by the imaging lens 1 is projected onto the pair of photodetector arrays simultaneously. The pair of photodetector arrays are alternately operated by control signals delivered from a central control device 4 and the outputs of respective photo-electro transducer elements are simultaneously supplied to a signal processing circuit 5 for both photodetector arrays.

The signal processing circuit 5 is constructed so that the output signals of the photo-electro transducer elements are subjected to an analog-to-digital (A/D) conversion in parallel and read out in turn by command signals delivered from a decoder 7. Reference numeral 8 is an evaluation value detecting circuit which is constructed so that it comprises a sorting device operated by signals from the central control device 4 and including an arithmetic and logic unit for calculating the absolute values of differences between adjacent digital signals corresponding to the output signals of respective photo-electro transducer elements supplied in turn from the signal processing circuit 5, the absolute values of the differences are sorted by the sorting device, and the sorted values are read in memories in the order of decreasing amount and read out according to command signals delivered from the central control device 4. The decoder 7 operates according to the control signals delivered from the central control device 4 and supplies the read out signals to respective memories of the signal processing device 5 for temporarily storing digital outputs coming from respective photo-electro transducer elements in the photodetector array.

Reference numeral 9 is an optical system driving control circuit which receives the focusing condition information signal detected by the method according to the present invention and supplied from the central control device 4 and generates control signals for driving an optical system drive device 10. The control device 9 is constructed so that the optical system drive device 10 is controlled by the control signals supplied therefrom, thereby moving the imaging lens 1 in the direction of the optical axis shown by an arrow 11 and stopping it at the position so that the values of evaluation functions obtained for every photodetector array are equal to one another.

Reference numeral 12 is a display device for displaying the focusing conditions. It is a matter of course that the optical system driving control circuit 9 and the optical system drive device 10 may be omitted in case of operating the imaging lens 1 with manual control, thereby performing only indication of the focusing conditions.

Figure 4:
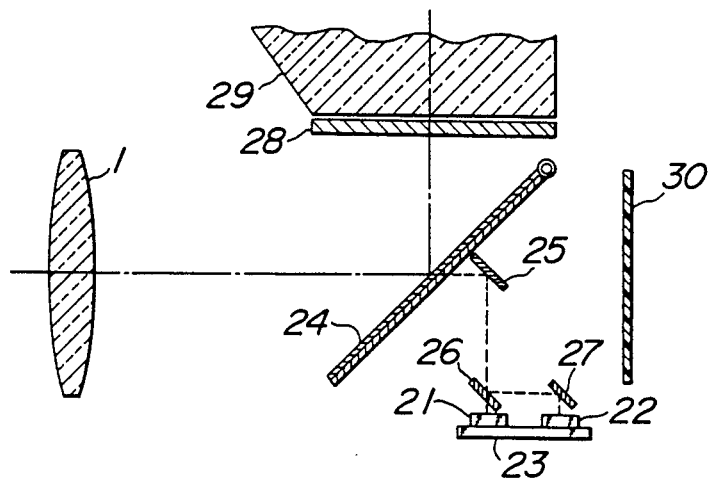
FIG. 4 is a schematic sectional view showing an arrangement of photodetector arrays used in a light receiver shown in FIG. 3.

FIG. 4 shows a constructional arrangement of a pair of photodetectors arrays using a single-lens reflex camera as an example of a construction of the light receiver 2.

A pair of photodetector arrays 21 and 22 are juxtaposed on a substrate 23 with a certain optical distance on both sides of a predetermined focal plane, and a part of the subject image formed by the imaging lens 1 is projected onto respective photodetector arrays 21 and 22 through a quick return half mirror 24, a mirror 25, a half mirror 26 and a mirror 27, respectively. Reference numeral 28 is a focusing screen, 29 a pentaprism for viewfinder, and 30 a shutter curtain.

Figure 5:
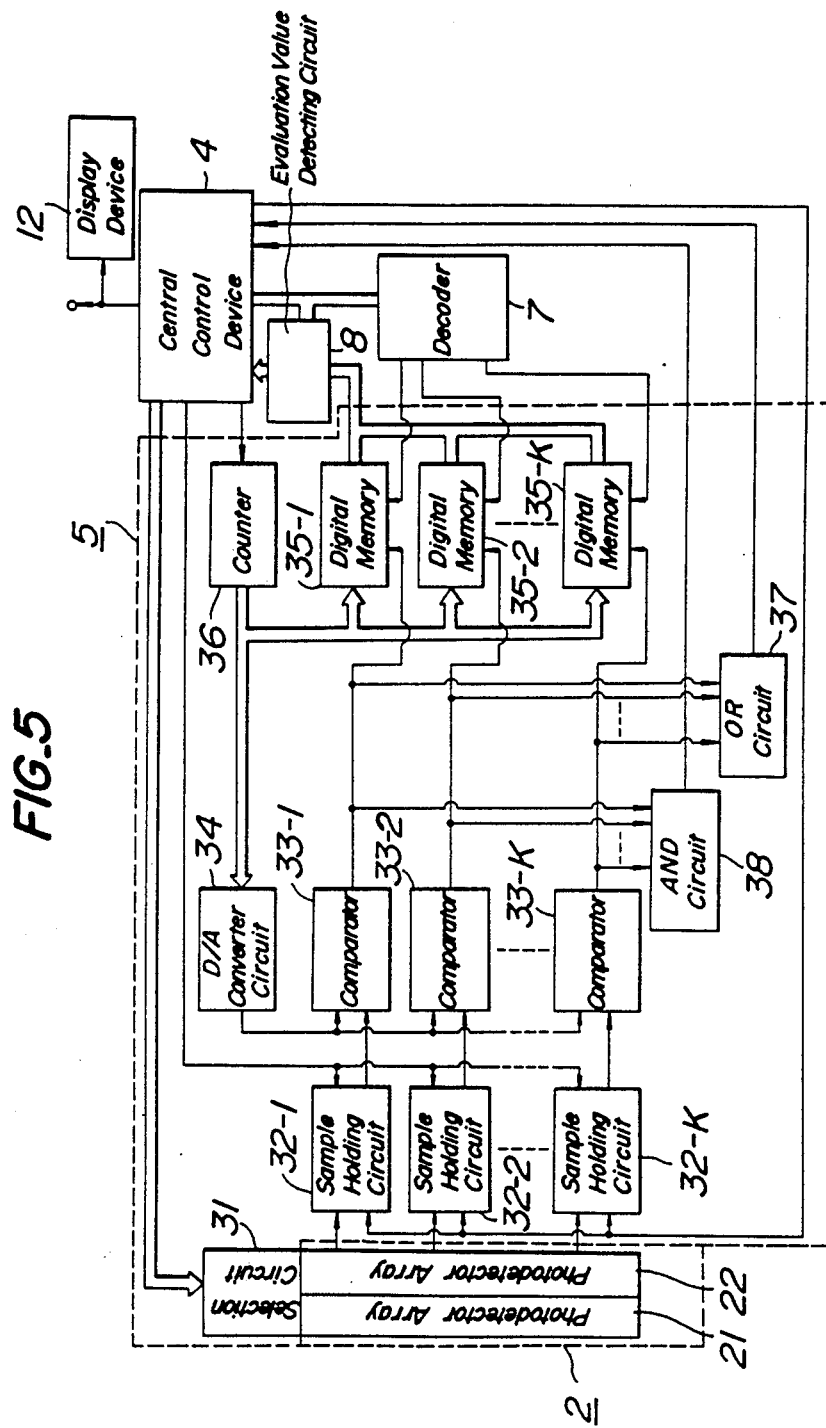
FIG. 5 is a schematic circuit diagram showing a signal processing circuit used in the apparatus shown in FIG. 3.

FIG. 5 shows a construction of the signal processing circuit 5 as an embodiment of a circuit arrangement for carrying out the method according to the present invention.

The outputs of the photodetector arrays 21, 22 forming the light receiver 2 are alternately switched by a selection circuit 31 operated by control signals delivered from the central control device 4, thereby supplying these outputs to respective sample holding circuits 32-1, 32-2, ... 32-K corresponding to respective photo-electro transducer elements forming the photodetector arrays.

The sample holding circuits 32-1, 32-2, ... 32-K are so constructed that they receive sampling signals from the central control device 4 to sample and hold the output signals of respective photo-electro transducer elements with the timing of the sampling signals.

Output signals of respective sample holding circuits 32-1, 32-2, ... 32-K are supplied to respective comparators 33-1, 33-2, ... 33-K, respectively to compare these output signals with output signals having stepwisely changing levels of a digital-to-analog converter circuit 34. The output signals compared in the comparators are supplied to digital memories 35-1, 35-2, ... 35-K as stored control signals.

Respective digital memories 35-1, 35-2, ... 35-K and the digital-to-analog converter circuit 34 receive digital signals from a counter 36 which counts the input pulse signals coming from the central control device 4 to generate parallel binary coded signals of, for example, 4 bits.

Output levels of the digital-to-analog converter circuit 34 which are supplied to the comparator circuit 33-1, 33-2, ... 33-K, are equal to the levels of the digital output signals from the counter 36 which supplies its output signals to respective digital memories 35-1, 35-2, ... 35-K, so that if the digital signals from the counter 36 are stored in respective digital memories 35-1, 35-2, ... 35-K with the timing of outut signals delivered from respective comparators 33-1, 33-2, ... 33-K, output signals from the respective photo-electro transducer elements of photodetector arrays 21 and 22 may be stored in the corresponding digital memories 35-1, 35-2, ... 35-K by converting these output signals into digital signals of 4 bit binary codes.

The timing for the sample holding circuit is so determined that output signals of respective comparators 33-1, 33-2, ... 33-K are supplied to an OR circuit 37, the ORed output signals are supplied to the central control device 4 to generate sampling signals having the timing of a firstly occurred comparison output signal from among output signals of respective comparators 33-1, 33-2, ... 33-K, and the sampling signals are supplied to one input of respective comparators 32-1, 32-2, ... 32-K.

An AND circuit 38 receives the output signals of respective comparators 33-1, 33-2, ... 33-K and supplies its ANDed outputs to the central control device 4 as signals for informing that the output signals of the comparators 33-1, 33-2, ... 33-K have been transferred to the digital memories 35-1, 35-2, ... 35-K.

The above described operation is performed by alternately processing the outputs of the photodetector arrays 21 and 22 with the sampling period and digital signals stored in the digital memories 35-1, 35-2, ... 35-K are read out successively by the reading out signals delivered from the decoder 7 and then supplied to the evaluation value detecting circuit 8. For convenient explanation, the present invention is explained by assuming that the output signals of one photodetector array are subjected to an analog-to-digital conversion and then supplied to the evaluation value detecting circuit 8. The decoder 7 serves to apply reading out signals to respective digital memories 35-1, 35-2, ... 35-K in the given order by the signals delivered from the central control device 4.

Figure 6:
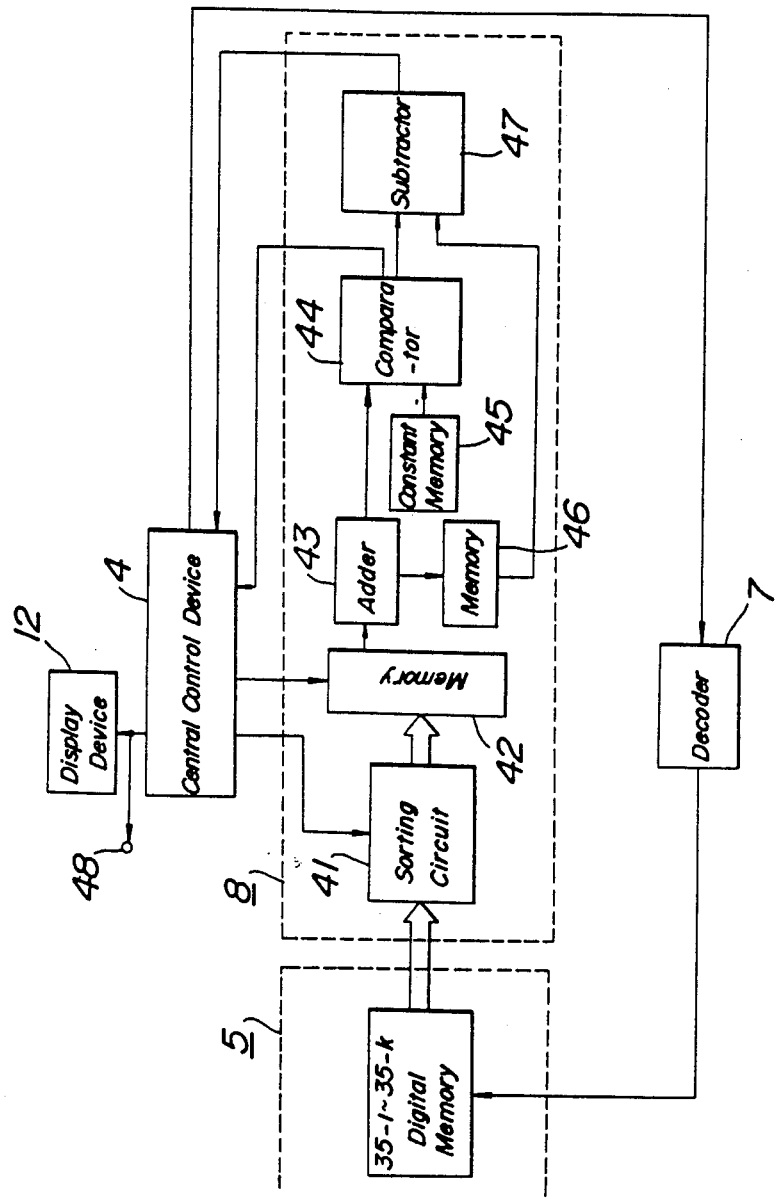
FIG. 6 is a schematic circuit diagram showing an evaluation value selecting circuit used in the apparatus shown in FIG. 3.

FIG. 6 shows a construction of the evaluation value detecting circuit 8. In the detecting circuit 8 the outputs of the photodetector array are supplied through the digital memories 35-1, 35-2, ... 35-K of the A/D converter circuit 5 to a sorting circuit 41 which is controlled by the control signals delivered from the central control device 4. The sorting circuit 41 counts the absolute values of differences between outputs of adjacent photo-electro transducer elements to store the difference signals having the values from the maximum value down to the N+Lth largest value selected from the absolute values of the differences in a memory 42 in the order of their magnitude.

The memory 42 is constructed so that the stored signals having the values from the maximum value down to the Nth value in the order of their magnitude selected from the stored absolute values of the differences are read out according to the command signals from the central control device 4.

The thus read out difference signals $D_K$ having the values from the maximum value up to the Nth largest value in the order of their magnitude are added in an adder 43. The added sum value $F_n$ is determined by the value "N" of the command signal delivered from the central control device 4 and can be expressed as following equation.

$$F_n = \sum_{K=1}^{N} D_K \qquad (1)$$

$D_K$ is the absolute values of differences between output signals of adjacent photo-electro transducer elements.

N is a positive integer within the range of $1 \leq N \leq K-2$, (K is the number of elements in the photodetector array).

In the above embodiment the present invention utilizes the above added sum value $F_n$ as a fine adjustment evaluation function. The fine adjustment herein means an adjustment in case that reflection density of the subject is changed in stepped form and uses an evaluation function expressed by a sum of difference signals having the N largest values selected from the absolute values of differences between photo-electro transduced signals of each adjacent photodetectors. When the evaluation value is less than a predetermined threshold value $K_L$, a command signal having values of "N+L" (L is positive integers) is supplied to the sorting circuit 41 from the central control circuit 4, thereby calculating the absolute values of the differences and storing the difference signals having the values from the maximum value until the "N+L"th largest value selected from among the absolute values of the difference in the memory 42. In addition thereto these difference signals are supplied to an adder 43 to obtain the added sum value $F_{n+l}$ which is shown as following equation.

$$F_{n+l} = \sum_{K=1}^{N+L} D_K \quad (2)$$

L is a positive integer within the range of $2 \leq N+L \leq K-1$.

The present invention utilizes the added sum value $F_{n+l}$ as a coarse adjustment evaluation function. The coarse adjustment herein means an adjustment in case that reflection density of the subject is changed in graded form and uses an evaluation function expressed by a sum of difference signals having the N+L largest values selected from the absolute values of the differences. To this end the output of the adder 43 is compared by a comparator 44 with a predetermined threshold $K_L$ which is set in a constant memory 45. When the output of the adder 43 is less than the threshold $K_L$ the output of the comparator 44 is supplied to the central control device 4 to change over the coarse adjustment evaluation function by changing the command signal N to be supplied to the memory 42 into the command signal "N+L".

In the manner described above, after the values of the fine adjustment evaluation function or the coarse adjustment evaluation function are obtained for each photodetector array which makes a pair, the values of the evaluation function for one photodetector array are supplied to a memory 46 temporarily and then to one input terminal of a subtractor 47 which receives the output of the comparator 44 at its other input terminal.

In the apparatus shown in FIG. 4 if optical images projected onto the photodetector arrays 21 and 22 by the imaging lens are under the so-called front and rear focus conditions and the focusing conditions are equal to one another, the input signals supplied to the subtractor 47 are equal in level so that the output of the subtractor 47 becomes zero resulting in an indication of the focusing conditions. In this case the focusing position thereof is positioned at the center of photodetector arrays 21 and 22 if the photodetector arrays 21 and 22 are equal in performance.

The output of the subtractor 47 is supplied to the central control device 4, thereby supplying the corresponding control signals to the optical system driving circuit 9 shown in FIG. 3 from a terminal 48 so that the imaging lens 1 can be automatically moved to the focusing position and the focusing conditions can be displayed by the display device 12.

As is explained by the above embodiment, the present invention provides a method of detecting the focusing conditions wherein the focusing conditions of the optical image projected onto photodetector arrays are detected based on the evaluation function taking the absolute values of differences between output signals of adjacent photodetectors in photodetector arrays as an evaluation value. The evaluation value is, at first, calculated by the fine adjustment evaluation function, and then if the evaluation value is less than a predetermined threshold, a new evaluation value is calculated by changing the fine adjustment evaluation function to the coarse adjustment evaluation function, thereby detecting the focusing conditions based on the new evaluation value.

Assuming that for the fine adjustment evaluation function, use is made of an evaluation function taking the evaluation value as the absolute value $D_1$ (the value N is 1) of the difference between output signals of adjacent photodetectors in photodetector arrays as shown in FIG. 7A and for the coarse adjustment evaluation function, use is made of an evaluation function taking the evaluation value as the absolute value having the sum of the maximum value and the second largest value $D_2$ selected from among the absolute values of the difference, i.e., $D_3 = D_1 + D_2$ (the value N is 1, the value L is 1), as is seen from FIG. 7A the value of the fine adjustment evaluation function $F_1$ becomes $|I_{(P7)} - I_{(P8)}|$, and the value of the coarse adjustment evaluation function becomes $|I_{(P6)} - I_{(P8)}|$ so that the value of the function $F_2$ becomes larger than that of the function $F_1$. As is seen from the above fact, in case of calculating the evaluation function for the graded subject it is advantageous that the sum of fairly many absolute values of the differences is taken as the coarse evaluation function.

FIG. 7B shows a relationship between the values of both evaluation functions and the moved amount of the imaging lens in the above described cases.

That is, when provision is made for a pair of photodetector arrays 21 and 22 as shown in FIG. 4 and an image of the graded subject is projected onto the respective photodetector arrays by the imaging lens 1, evaluation functions $F_1$-a and $F_1$-b are obtained as the fine adjustment evaluation function, and the level of the skirt portions thereof fluctuates by the superposition of various noise components so that it is difficult to detect the focusing point.

According to the present invention such a state is compared with the predetermined threshold $K_L$ having a level slightly higher than that of the conventional threshold value K, and then if the value of the function $F_1$-a is less than the threshold $K_L$ the evaluation value is obtained by the above described coarse adjustment evaluation function. As a result of this a large peak is obtained as shown in functions $F_2$-a and $F_2$-b, thereby detecting the focusing condition easily.

Therefore, the position at which the evaluation values obtained by both the photodetector arrays are coincident with each other corresponds with the focusing position of the imaging lens 1.

Moreover, there is a best value N for a certain kind of subject image and if this value N is too large the change of evaluation value to the moved amount of the imaging lens becomes smaller so that it is necessary to take this point into consideration in order to select the value N.

The present invention is not limited to the above embodiment, but various alterations or modifications can be possible. For example, only one array of photodetectors may be arranged in the predetermined focal plane.

According to the above described method it is easy to detect the focusing conditions of the imaging lens for the subject having the graded reflection density whose focusing condition is difficult to be detected by the conventional method. Evaluation functions, moreover, are changed over in accordance with the state of reflection density of the subject so that the focusing position of the imaging lens for various subjects can be detected and thus its industrial effect becomes large.

What is claimed is:

1. A method of detecting focusing conditions comprising the steps of:

providing at least one photodetector array including K photo-electric transducer elements arranged at or near a focusing plane for an imaging lens and/or a plane optically conjugated with the focusing plane;

projecting a subject image onto the photo-electro transducer elements through the imaging lens, thereby generating photo-electro transduced signals;

calculating an evaluation function value representing the contrast or sharpness of the subject image from the photo-electro transducer signals; and determining a focusing condition of the imaging lens based on the calculated evaluation function value; the improvement comprising the steps of:

providing for each said photodetector array a first evaluation function to calculate said evaluation function value based on photo-electro transduced signals supplied from a predetermined number of said photodetector elements, said predetermined number being less than all of said photodetector elements, and a second evaluation function to calculate said evaluation function value based on a larger number of photodetector elements than said predetermined number; and determining said focusing condition using said first evaluation function or said second evaluation function, said determination being performed by said second evaluation function when said evaluation function value obtained using said first evaluation function is less than a predetermined threshold value, and using said first evaluation function otherwise.

2. A method of detecting focusing conditions as claimed in claim 1, wherein said first evaluation function is expressed by the sum of difference signals having the N largest values selected from the absolute values of differences between the photo-electro transduced signals of each adjacent photodetector in the photodetector array, and said second evaluation function is expressed by the sum of difference signals having the $N+L$ largest values selected from the absolute values of said differences, wherein N is a positive integer within the range of $1 \leq N \leq K-2$, and L is a positive integer within the range of $2 \leq N+L \leq K-1$.

3. A method of detecting focusing conditions as claimed in claim 1, wherein it is determined electronically whether said first evaluation function or said second evaluation function is used to determine said focusing condition.

4. A method of detecting focusing conditions as claimed in claim 2, wherein the value of N is 1 and the value of $N+L$ is 2.

5. A method of detecting focusing conditions as claimed in claim 1, wherein two photodetector arrays are arranged on both sides of said focal plane and/or optically conjugated plane at a certain optical distance from each other, and wherein a third evaluation function expressed as the difference between the respective first evaluation functions of the respective photodetector arrays and a fourth evaluation function expressed as the difference between the respective second evaluation functions of the respective photodetector arrays are provided, and said focusing condition is determined using said third evaluation function or said fourth evaluation function, said determination being performed using said fourth evaluation function when said the evaluation function value obtained by said third evaluation function is less than a predetermined threshold value and using said third evaluation function otherwise.

6. A method of detecting focusing conditions as claimed in claim 6, wherein said first evaluation function is the sum of difference signals having the N largest values selected from the absolute values of differences between the photo-electro transduced signals of each adjacent photodetector in each photodetector array, and said second evaluation function is the sum of difference signals having the $N+L$ largest values selected from the absolute values of said differences, wherein N is a positive integer within the range of $1 \leq N \leq K-2$, and L is a positive integer within the range of $2 \leq N+L \leq K-1$.

7. A method of detecting focusing conditions as claimed in claim 5, wherein it is determined electronically whether said third evaluation function or said fourth evaluation function is used to determine said focusing condition.

8. A method of detecting focusing conditions as claimed in claim 6, wherein the value of N is 1 and the value of $N+L$ is 2.

9. A method of detecting focusing conditions comprising the steps of:

providing at least one photodetector array including K photo-electro transducer elements arranged at or near a focusing plane for an imaging lens and/or a plane optically conjugated with the focusing plane;

projecting a subject image onto the photo-electro transducer elements through the imaging lens, thereby generating photo-electro transduced signals;

calculating an evaluation function value representing the contrast or sharpness of the subject image from the photo-electro transduced signals; and determining a focusing condition of the imaging lens based on the calculated evaluation function value; the improvement comprising the steps of:

providing a first evaluation function and a second evaluation function, wherein said first evaluation function is expressed by the sum of difference signals having the N largest values of the absolute values of differences between the photo-electro transduced signals of each adjacent photodetector in the photodetector array, and said second evaluation function is expressed by the sum of difference signals having the $N+L$ largest values of the absolute values of said differences, wherein N is a positive integer within the range of $1 \leq N \leq K-2$ and L is a positive integer within the range of $2 \leq N+L \leq K-1$; and determining a focusing condition using said first evaluation function or said second evaluation function, said determination being performed using said second evaluation function when said evaluation function value obtained using said first evaluation function is less than a predetermined threshold value, and using said first evaluation function otherwise.

* * * * *